United States Patent Office 3,167,439
Patented Jan. 26, 1965

3,167,439
COATING COMPOSITION
Mark S. Vukasovich, Wickliffe, and Herbert L. Johns and Eugene Wainer, Cleveland, Ohio, assignors to Horizons Incorporated, a corporation of New Jersey
No Drawing. Filed Aug. 24, 1961, Ser. No. 133,581
3 Claims. (Cl. 106—85)

This invention relates to a paint based on a cold setting mixture of inorganic oxides. More particularly, it relates to the manner in which shelf stability is imparted to a paint which sets at room temperature into a hard mass, resistant to water and capable of retaining its physical structure at temperatures in excess of 2500° F.

Briefly the cold setting paint of the present invention is based on four inorganic oxides, namely: $Al_2O_3$, $CaO$, $SiO_2$ and $P_2O_5$, in suitable proportions, in a vehicle which may be a vaporizable carrier comprising either water or an aqueous solution or an organic liquid, or a combination of organic liquids plus water or aqueous solution.

Compositions of the nature described set rapidly, even at room temperature, as described in Yedlick et al., United States Patent 2,687,967 disclosing a method of delaying the set of such compositions involving preparation and storage of such compositions under refrigeration, or at temperatures well below room temperature.

One object of the invention is to provide paint compositions which may be stored in closed containers at room temperature for indefinite periods without undergoing a setting reaction and which, when taken from storage, set into a hard water-resistant mass without the application of heat from an external source.

A more specific object is to provide shelf stable compositions useful in the protection and painting of concrete, ceramic, wood, metal or other suitable substrate, and hence of particular utility for applications in the building industry, e.g., to siding, shingles, decorative panels, highway paint, paint for cement or cinder blocks, clay bricks or the like, which are shelf stable at room temperature and do not react or set up for cure until applied to the desired surface.

Still other objects will become apparent or be specifically pointed out in the description which follows.

In the paints rendered shelf stable in accordance with the teachings of the present invention, four oxides are combined in suitable proportions. Preferably these are not utilized as the individual oxides, except in special instances discussed below. Instead it is preferred to first combine two or more of the four oxides into intermediate compounds or compositions from which the final paint is formulated. Thus the alumina and $P_2O_5$ are preferably combined chemically into an aluminum phosphate in which the ratio of $Al_2O_3$ to $P_2O_5$ is between one mole of $Al_2O_3$ for each two to three moles of $P_2O_5$, before they are brought into association with the silica or calcium oxide portion of the final composition.

Any of several known methods may be employed to produce an aluminum phosphate suitable for the present purposes, namely one in which the aluminum oxide is completely dissolved, and it is even possible to use commercially available products such as Alkophos-CE, an acidic monoaluminum phosphate marketed by the Monsanto Chemical Company, for this portion of the composition.

In the aluminum phosphates utilized in this invention, the proportions of $Al_2O_3$ to $P_2O_5$ should be within the range of one mole of $Al_2O_3$ for each two to three moles of $P_2O_5$.

The amount of water or other vaporizable liquid vehicle in which the aluminum phosphate is dissolved should constitute not more than about 50% by weight of the aluminum phosphate solution which is preferably a somewhat viscous liquid at this stage of the formulation. Consequently it is preferable to use either $P_2O_5$ or concentrated phosphoric acid of about 85% $H_3PO_4$ concentration when preparing the aluminum phosphate.

For most purposes, the two remaining constituents are added to the aluminum phosphate as a calcium silicate or a calcium aluminum silicate, or mixtures of the two, the principal exception being a consequence of utilization of a calcareous substrate to furnish a substantial portion of the lime in the coating composition, or the use of other substrate to furnish silica or alumina to the resultant coating.

A preferred calcium silicate is wollastonite, a particularly pure mineral in which the ratio of CaO to $SiO_2$ is substantially equimolar. The wollastonite is preferably comminuted to minus 200 mesh (Tyler Standard) before incorporation in the paint composition.

Using wollastonite as the source of CaO and $SiO_2$ in the composition and an aluminum phosphate prepared as described above as the source of $Al_2O_3$ and $P_2O_5$ in the composition, cold setting compositions are obtained with proportions ranging from 5 parts of wollastonite plus 95 parts of aluminum phosphate to 90 parts of wollastonite plus 10 parts of aluminum phosphate, all parts being by weight. The setting of compositions at the extremes of this range was found to be too slow, and hence only compositions consisting of between 10 and 70 parts by weight of wollastonite and 90 to 30 parts by weight of aluminum phosphate are useful in the paints of this invention, the 40:60 composition being noticeably stronger than the remaining compositions within this range.

While we do not wish to be bound by any specific theory as to the manner in which the ingredients combine to form the hard, cold set, water-resistant coating, observations under a microscope indicate that the surface of the calcium silicate is attacked by the liquid phosphate, and may be partly dissolved therein, whereupon a gel appears to form from the calcium and silicon oxides, temporarily placed in solution. This in turn reacts with the soluble alumina in the phosphate to produce what appears to be a complex hydrate.

Other constituents may be added to the formulation, within limits. The effect of added silica appears to depend to some extent on the particle size of the silica. Additions of fine silica (minus 325 mesh, Tyler Standard) produces a paint which forms open cracks when exposed to water particularly at elevated temperatures, whereas additions of coarser silica (plus 60 mesh) do not produce this result. Up to about 40% by weight of silica (minus 140 mesh) may be added to the composition without producing a loose crumbly coating. The permissible amount of silica which may be added appears to depend also, in part, on the amount of alumina in the system, the higher the alumina, the higher the amount of silica which may be tolerated without unduly prolonging the interval required for setting the composition.

The usual pigments and organic colorants may also be added to the above compositions. With the additives listed below, typical compositions have exhibited the following colors.

| Addition: | Resulting paint |
|---|---|
| None | White. |
| $TiO_2$ | Do. |
| Carbon | Black. |
| Iron oxide | Red. |
| Chromium oxide | Green. |
| Lead chromate | Yellow. |
| Cobalt alumina stain | Blue. |

The calcium alumina-silico-phosphate paint described above is extremely water-resistant and possesses a high degree of water repellance, but it is possible to waterproof the coating still further by adding up to 10% by weight of a butadiene-styrene polymer emulsion (e.g., Dow No. 512R, containing 48% solids) or other waterproofing material.

Instead of water, it is possible to use any of a number of water compatible solvents or mixtures of the same as the vaporizable liquid carrier for the four oxides constituting the basis of the paint composition. These may be taken from the group consisting of alcohols, ketones, glycols, glycol ethers and mixtures thereof. The use of such liquids permits a ready adjustment in the viscosity of the paint and permits the working time to be extended substantially.

As an example of the effectiveness of these solvents, a particular paint composition made up in the absence of such solvents will have a pot life of 2 to 4 hours. With the addition of 10% of an alcohol such as methyl alcohol, isopropyl alcohol, and the like, this pot life is doubled and a somewhat similar result is obtained with the simpler ketones such as acetone or methyl ethyl ketone. By using 20% of these alcohols or ketones, the pot life is extended into the range of 12 to 16 hours, and in some instances as long as 24 hours. Even then vigorous stirring was sufficient to break up the mix so that it again could be applied by brushing or spraying and still undergo suitable setting and hardening when applied to a surface, once the solvent was evaporated and the moisture of the air was permitted to become active.

The glycols and the glycol ethers, however, are very much more effective than either the alcohols or the ketones, though these latter can be added to the glycol ethers for desired modifications of viscosity in order to facilitate painting or spraying, in amounts not exceeding 25% of the glycol or the glycol ether.

Suitable glycol ethers are the glycol monomethyl ether, generally designated as methyl cellosolve; glycol monomethyl ether acetate, generally designated as methyl Cellosolve acetate; glycol monoethyl ether, generally designated as Cellosolve. The most suitable glycol is 1,2-ethanediol.

A particularly preferred substrate to which the above described paints may be applied is aluminum. Adhesion to metallic aluminum is substantial and adhesion to other metals may be enhanced by etching or otherwise roughening, or by aluminizing the surface.

Adhesion to aluminum surfaces is improved by adding minor amounts, e.g., up to about 2% by weight of oxides of metals which are more electronegative than aluminum, to the paint formulation. Suitable oxides added for this purpose include the oxides of tin, lead, copper, zinc, cadmium, antimony, bismuth, iron and the like.

Adherence is further improved if the surface is dried at temperatures between about 100° C. and 125° C. after it has been painted with a paint to which one of the above oxides has been added.

The paint compositions described above suffer from one distinct disadvantage, in that they are not shelf stable. The paints set up in bulk, and hence must be mixed immediately prior to use or stored under refrigeration as described in the aforesaid U.S. Patent 2,687,967. The present invention is directed to overcoming this disadvantage.

THE PRESENT INVENTION

The present invention is directed to improving the shelf stability of compositions of the type described above and to provide compositions which may be stored in closed containers for extended time intervals without experiencing the setting up reaction which, when it occurs before use, renders the compositions unfit for their intended application as paints or protective coatings.

Several modes of avoiding the premature setting up reaction have been found to overcome the disadvantage noted in the prior art, namely modification of the composition and modification of the manner in which it is prepared.

SHELF STABILITY BY COMPOSITION MODIFICATION

(a) Low wollastonite compositions

It has been found that composition containing not more than 10% by weight of wollastonite and preferably between about 2% and 8% by weight of wollastonite exhibited good shelf stability when stored in a closed container such as a glass jar, whereas composition with more than 10% wollastonite set up in containers stored at room temperature, unless prepared in the specific manner described in a later portion of this specification.

The following are illustrative shelf stable compositions which yield coatings with a very high order of water resistance (no visible effect from 175° F. water), adherency and glossy appearance when applied on concrete blocks (all parts being by weight):

A

| | |
|---|---|
| 250 cc. of Alkophos-CE | |
| 100 cc. of nitric acid of specific gravity 1.42 | 95 |
| 100 cc. of water | |
| Wollastonite | 5 |
| | 100 |

B

| | |
|---|---|
| Alkophos-CE | 27 |
| Silica —325 mesh | 40.5 |
| Aluminum chloride | 13.5 |
| Hydrochloric acid of specific gravity 1.19 | 13.5 |
| Wollastonite | 5.5 |
| | 100.0 |

C

| | |
|---|---|
| Alkophos-CE | 70 |
| Silica —140 mesh | 30 |
| | 92 |
| | 100 |
| Wollastonite | 8 |
| | 100 |

D

| | |
|---|---|
| Aluminum hydroxide } Al₂O₃.3P₂O₅ | 33 |
| Phosphorus pentoxide | |
| Water | 34 |
| Silica —140 mesh | 33 |
| | 90 |
| | 100 |
| Wollastonite | 10 |
| | 100 |

(b) Low lime compositions

Another way in which shelf stable compositions are obtained is to omit substantially all of the lime from the composition. This results in a shelf stable paint which is suitable for use on substrates which are capable of furnishing a portion of the lime required for the proper setting up of the composition.

For application to concrete or concrete blocks, wherein lime, calcium silicate or calcium carbonate or other calcium compounds present are attacked by the acid moiety of the composition, at least some of the lime is omitted from the paint compositions previously described, since it has been found that the concrete will supply the CaO necessary in the final coating after the paint has been applied.

One exemplary composition illustrating this aspect of the invention consisted of the following:

250 cc. of aluminum phosphate (Alkophos–CE)
100 cc. of nitric acid (sp. gr. 1.42)
100 cc. of water After thoroughly mixing the above, 100 grams of minus 140 mesh flint (silica) was added. The resulting paint exhibited good shelf stability when stored at room temperature in sealed glass jars, for weeks and even months. When applied to concrete blocks by spraying or brushing, the composition formed a hard, water-resistant coating on the concrete block, although the coating was not as hard as a coating formed with some wollastonite in the original paint mixture.

Compositions containing not over 10% wollastonite have been found to possess adequate shelf stability and hence not all of the lime need be omitted from the composition.

SHELF STABILITY BY PROCESSING MODIFICATION

It has also been found possible to increase the shelf stability of compositions containing more than 10% by weight of wollastonite, by modifying the manner in which the composition is prepared.

In preparing the paints described above it was observed that a pronounced exothermic reaction took place when the aluminum phosphate and silica were brought together, particularly in the presence of small amounts of mineral acids and aluminum chloride. It was further noted that the mixture was still free-flowing after the heat of reaction had dissipated, and that if wollastonite was added to the reacted materials at this time, as much as 30% by weight of wollastonite could be added to some compositions without producing a paint which set up on storage in a closed container.

Setting up of these paints in which wollastonite had been added to a pre-reacted mixture was found to be accelerated by the addition of a small amount of water, usually less than about 5% by weight. Coatings produced with paints formulated in this manner, i.e., with a deferred addition of wollastonite, when set up on concrete surfaces, possessed a toughness, adherence and water resistance comparable to that of the coatings produced from the paints with poor shelf stability applied directly after preparation.

Similar behavior was noted in other systems wherein an exothermic pre-reaction could be effected. Several alternative methods of obtaining the pre-reaction are illustrated in the examples which follow.

In Example I the presence of aluminum chloride and mineral acid appear to contribute to the evolution of heat; in Example II the heat is obtained largely from the reaction of $P_2O_5$ with aluminum hydroxide; and in Example III the heat for "pre-reaction" is obtained by refluxing the illustrated composition which does not react spontaneously. The Example III composition was not capable of retaining much more than 10% by weight of wollastonite and hence offered no apparent advantages over the low wollastonite paints described above.

Three compositions illustrating this aspect of the invention are set forth below (all parts being by weight):

I (1) Prereacted:[1]
   Alkophos-CE _____ 32
   Silica —140 mesh _____ 40
   Hydrochloric acid of specific gravity 1.19 ___ 14
   Aluminum chloride _____ 14
                                                 ----
                                                 100    70

Wollastonite _____ 30

[1] The pre-reactants were stored overnight before adding the wollastonite.

II (2) Prereacted:
   Aluminum hydroxide } $Al_2O_3 \cdot 3P_2O_5$ __ 33
   Phosphorus pentoxide }
   Water _____ 34
   Silica —140 mesh _____ 33
                                                 ----
                                                 100    80

Wollastonite[1] _____ 20
                                                 ----
                                                 100

[1] Wollastonite was added the next day.

III (3) Prereacted:[1]
   Alkophos-CE _____ 45
   Silica —140 mesh _____ 45
   Nitric acid of specific gravity 1.42 _____ 10
                                                 ----
                                                 100    90

Wollastonite _____ 10
                                                 ----
                                                 100

[1] The pre-reactants were refluxed for 2½ hours, then allowed to cool overnight before adding the wollastonite.

The resulting compositions were found to exhibit good shelf stability even though they contained wollastonite in substantial amounts, and it appears that formulations which may possess a low-viscosity, relatively high water content and high mineral acid content are quite stable when stored in sealed containers if the wollastonite was added after the pre-reaction has been effected, either as a spontaneous exothermic reaction or by the application of heat to the mixture.

In Examples I, II and III above, silica was employed in the pre-reaction formulation, but it is also possible to utilize calcium silicate or calcium alumino-silicate in suitable proportions, instead of the silica, or as a substitute for a portion of the silica. By pre-reacting calcium silicate with phosphoric acid, a mixture is obtained which reacts with kaolin to produce an air setting cement. The following example illustrates the preparation of one such pre-reacted mixture.

IV

One mole of calcium silicate, and 2 moles of $P_2O_5$ are mixed in the presence of 6 moles of water. The resultant liquid is the "pre-reaction" product. When 1 mole of the $CaSiO_3 \cdot 2P_2O_5$ so obtained is reacted with 1 mole of kaolin, a mixture capable of being painted or sprayed is obtained. The material sets up more slowly than the $Al_2O_3$, $P_2O_5$, $CaSiO_3$ paint system first described above but eventually develops a very hard bright surface.

In addition to the foregoing, the use of this prereacted calcium silicophosphate in compositions such as those described above, improves brightness and reflectancy.

Compositions were prepared containing varying amounts of pre-reacted calcium silicophosphate in the range of 8 to 24 parts, added to a base composition of 38 parts Alkophos, and 10 parts of methyl ethyl ketone. All produced air-setting cements. It thus appears that cementitious masses are available for properly chosen areas in a quaternary diagram involving calcium oxide, silicon dioxide, aluminum oxide, and phosphate materials; namely between 2.7 and 33.8% $Al_2O_3$, between 10.7 and 49.0% CaO, between 7.3 and 73.3% $SiO_2$, and between 10.4 and 69.5% $P_2O_5$.

The shelf stable compositions prepared in accordance with the preceding description are readily suited to packaging and distribution. Since they set to hard, durable cementitious masses, they are useful in the production of molded shapes of widely varying dimensions, and may be utilized for this purpose, either as formulated or with additional filler materials. Furthermore, the compositions are particularly useful as potting compositions in place of commonly used resins which tend to become brittle and to crack upon extended exposures to various environments.

Having now described preferred embodiments of the invention in accordance with the patent statutes it is not intended that the invention be limited except as required by the appended claims.

We claim:
1. A shelf-stable paint consisting essentially of an acidic aluminum phosphate solution containing between 2% and 8% by weight of wollastonite therein.
2. The paint of claim 1 wherein the liquid comprising said solution is selected from the group consisting of water, and water-compatible alcohols, ketones, glycols and glycol ethers.
3. A composition for painting aluminum and aluminum alloy surfaces comprising the composition of claim 2, including in addition up to about 2% of oxide of metals which are more electronegative than aluminum, selected from the group consisting of tin, lead, copper, zinc, cadmium, antimony, bismuth, and iron.

References Cited by the Examiner
UNITED STATES PATENTS 2,687,967   8/54   Yedlick et al. _____ 106—286
2,741,565   4/56   Halversen et al. _____ 117—118

TOBIAS E. LEVOW, *Primary Examiner.*

JOSEPH REBOLD, *Examiner.*